Sept. 19, 1939.   F. J. OSUCH   2,173,564
WASHING AND DRYING APPARATUS
Filed Oct. 7, 1935
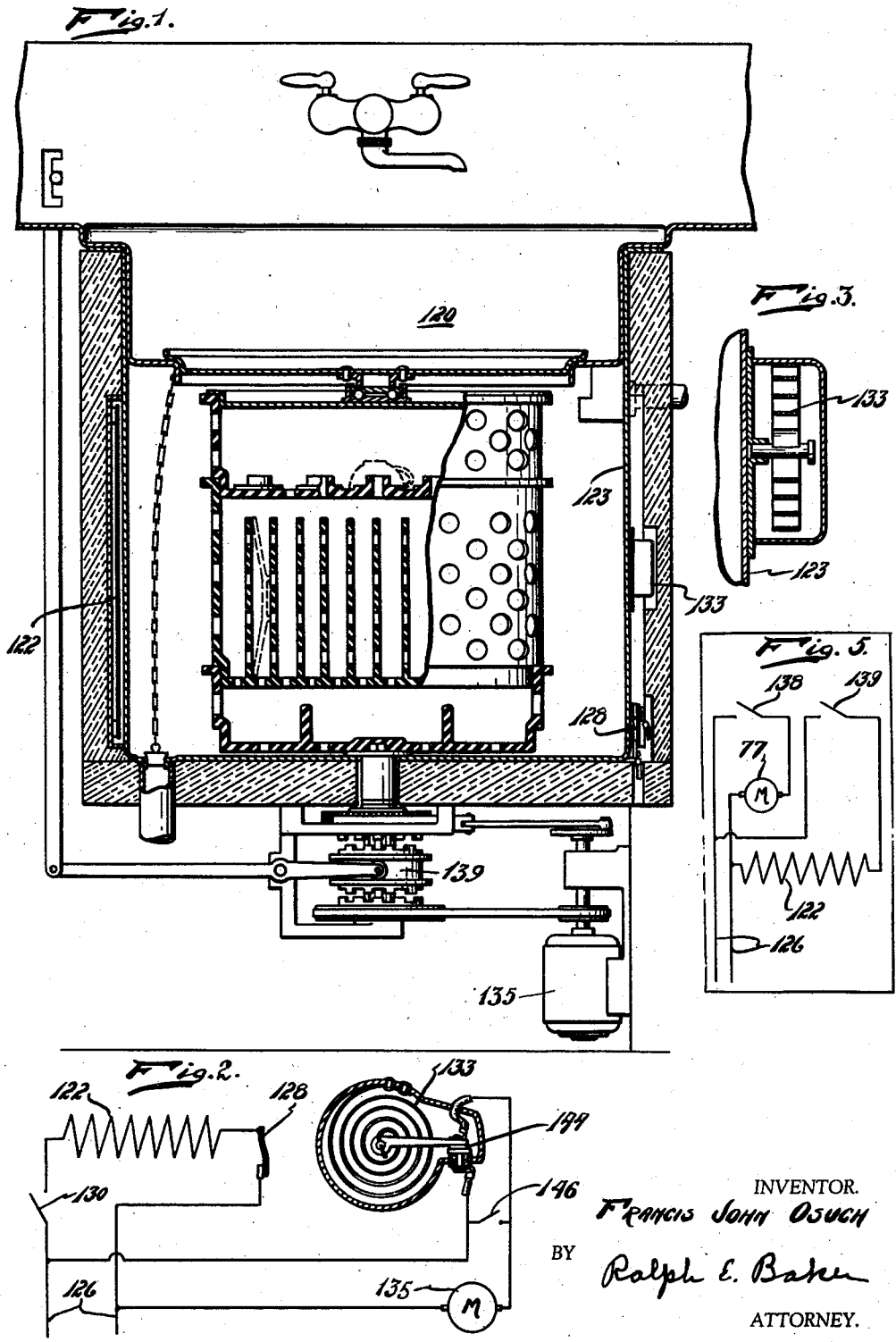
INVENTOR.
FRANCIS JOHN OSUCH
BY Ralph E. Baker
ATTORNEY.

Patented Sept. 19, 1939

2,173,564

UNITED STATES PATENT OFFICE 2,173,564

WASHING AND DRYING APPARATUS

Francis John Osuch, Detroit, Mich., assignor to Robot-Hand Corporation, Detroit, Mich., a corporation of Delaware Application October 7, 1935, Serial No. 43,876

1 Claim. (Cl. 141—9)

This invention relates to washing and drying apparatus, and particularly such apparatus as is used for washing and drying dishes, clothes and the like.

One of the objects of my invention is to provide an improved washing and drying machine for dishes and the like.

Another object of my invention is to provide an improved arrangement for heating water for washing and rinsing dishes in a tub.

Another object of my invention is to provide an improved washing apparatus for the washing of dishes and drying same within the tub.

Further and other objects and advantages will be apparent from the following description, reference being had to the accompanying drawing.

In the drawing:

Fig. 1 is a vertical view in cross section of an apparatus embodying features of my invention;

Fig. 2 is a diagrammatic view of the electric heating and motor circuits; and

Fig. 3 is a view of a thermal element embodying features of my invention.

In Fig. 1 of the drawing, I have shown a washing and drying apparatus designated, in general, as 120. In this apparatus there is provided a heating element 122 which surrounds the major portion of a tub 123. The heating element is adapted for heating the water within the tub 123 when a ready supply of hot water is not available for washing the objects in the tub. The heating element 122 is connected with power mains 126 and within the circuit is provided a bi-metallic thermal element 128 which is responsive to changes in temperature of the water within the tub 123 so that when the water attains a predetermined temperature, the bi-metallic element 128 interrupts the circuit through the heating element to de-energize same. A switch 130 is provided for controlling the flow of current through the circuit to the heating element 122. Also, connected with the power mains 126 is a thermal element 133 and this element is also responsive to changes in temperature of the water within the tub 123 for controlling the operation of a motor 135. The motor 135 is adapted to actuate an agitator or rack 137 by means of actuating mechanism 139. The type agitator and actuating mechanism herein shown are merely exemplary and form no part of the present invention. Any suitable agitator and actuating mechanism may be used as desired. Thermal elements 128 and 133 are placed in contact with the side wall of the container 123 so that they may be effected by the temperatures of the water within the tub 123. By this arrangement, all that is necessary is to close the switch 130 and the heating element 122 will heat the water in the container 123 to the desired temperature when the circuit to the heating element will be interrupted. Just prior to the time when the thermal element 128 breaks the circuit to the heating element 122, the thermal element 133 is adapted to close contacts 144 to complete the circuit to the motor 135 so as to initiate washing action within the tub 123. When the water in tub 123 attains a predetermined low temperature, the thermal element 133 will actuate contacts 144 to interrupt the flow of current to motor 135. In the event that it is desired to effect operation of the motor 135, irrespective of the thermal elements 128 and 133, I have provided a switch 146 which will connect motor 135 with power mains 126.

Although only a preferred form of the invention has been illustrated, and that form described in detail, it will be apparent to those skilled in the art that various modifications may be made therein without departing from the spirit of the invention or from the scope of the appended claim.

I claim:

A device of the character described comprising a tub adapted to contain a quantity of washing fluid, heating means for heating said washing fluid, thermostatic means responsive to changes in temperature of said fluid for discontinuing operation of the heating means when the temperature of said fluid attains a certain value, and means operable in response to changes in temperature of said fluid for agitating said fluid, and being arranged to be operable when the temperature of said fluid reaches a certain high value under the influence of said heating means.

FRANCIS JOHN OSUCH.